United States Patent
Sudo et al.

(10) Patent No.: US 9,366,937 B2
(45) Date of Patent: Jun. 14, 2016

(54) OPTICAL PULSE-GENERATOR

(71) Applicant: Sumitomo Osaka Cement Co., Ltd., Tokyo (JP)

(72) Inventors: Masaaki Sudo, Tokyo (JP); Tokutaka Hara, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 14/371,271

(22) PCT Filed: Jan. 11, 2013

(86) PCT No.: PCT/JP2013/050432
§ 371 (c)(1),
(2) Date: Jul. 9, 2014

(87) PCT Pub. No.: WO2013/105649
PCT Pub. Date: Jul. 18, 2013

(65) Prior Publication Data
US 2015/0043864 A1    Feb. 12, 2015

(30) Foreign Application Priority Data

Jan. 13, 2012  (JP) ................... 2012-005171

(51) Int. Cl.
*G02F 1/01* (2006.01)
*G02F 1/225* (2006.01)
(Continued)

(52) U.S. Cl.
CPC .............. *G02F 1/225* (2013.01); *H04B 10/506* (2013.01); *G02B 6/02085* (2013.01); *G02B 6/2932* (2013.01); *G02F 2001/212* (2013.01); *G02F 2203/25* (2013.01); *G02F 2203/56* (2013.01)

(58) Field of Classification Search
None
See application file for complete search history.

(56) References Cited

U.S. PATENT DOCUMENTS 5,473,458 A * 12/1995 Mamyshev ...... H04B 10/25077
398/142
5,778,015 A * 7/1998 Gunning ............... H01S 5/4006
372/25

(Continued)

FOREIGN PATENT DOCUMENTS

JP    8-171103 A    7/1996
JP    10-221658 A    8/1998

(Continued)

OTHER PUBLICATIONS

Z. Jiang et al. Optical arbitrary waveform processing of more than 100 spectral comb lines. Nature Photonics, vol. 1, pp. 463-467, Aug. 2007.*

(Continued)

*Primary Examiner* — Mike Stahl
(74) *Attorney, Agent, or Firm* — Wood, Herron & Evans, LLP (57) ABSTRACT

Provided is an optical pulse-generator capable of efficiently using by a low driving voltage an entire band of an optical frequency comb input to a chirp compensator for the formation of an optical pulse. According to a graph shown in FIG. 4, dispersion compensation amounts (dispersion characteristics) necessary for a chirp (dispersion) compensator to efficiently compress an optical frequency comb which sinusoidally changes become an inverse of a parabolic coefficient. It is found that the dispersion compensation amount required at the center frequency is $2/\pi$ of that of a chirp being approximate to a linear chirp, and the required dispersion compensation amount increases as the frequency shift increases.

18 Claims, 8 Drawing Sheets

(51) Int. Cl.
*H04B 10/50* (2013.01)
*G02F 1/21* (2006.01)
*G02B 6/02* (2006.01)
*G02B 6/293* (2006.01)

(56) References Cited

U.S. PATENT DOCUMENTS

| | | | | |
|---|---|---|---|---|
| 5,923,683 | A | * | 7/1999 | Morioka ............... G02F 1/3515 359/330 |
| 5,963,567 | A | * | 10/1999 | Veselka ................ G02F 1/0327 372/21 |
| 8,798,107 | B2 | * | 8/2014 | Deladurantaye .... H01S 3/06754 372/25 |
| 2002/0015212 | A1 | * | 2/2002 | Fujiwara ............... G02F 1/0121 359/238 |
| 2003/0147116 | A1 | * | 8/2003 | Shpantzer ........ H04B 10/25137 359/264 |
| 2005/0190432 | A1 | * | 9/2005 | Futami ............. H04B 10/25137 359/299 |
| 2008/0089698 | A1 | * | 4/2008 | Jiang .................... H04B 10/505 398/189 |
| 2009/0016669 | A1 | * | 1/2009 | Oguri ..................... G02F 1/365 385/11 |
| 2009/0097854 | A1 | * | 4/2009 | Futami .................... H04J 14/08 398/98 |
| 2015/0029575 | A1 | * | 1/2015 | Hara ........................ G01J 3/10 359/279 |

FOREIGN PATENT DOCUMENTS

| JP | 2007248660 A | | 9/2007 |
|---|---|---|---|
| JP | 2010-217365 A | * | 9/2010 |

OTHER PUBLICATIONS

English translation of written opinion for PCT/JP2013/050432, dated Feb. 12, 2013.*

T. Komukai et al, "Optical Pulse Generator Using Phase Modulator and Linearly Chirped Fiber Bragg Gratings," IEEE Photonics Technology Letters, vol. 17, No. 8, pp. 1746-1748 (Aug. 2005) (3 pages).

T. Otsuji et al., 10-80-Gb/s Highly Extinctive Electrooptic Pulse Pattern Generation, IEEE Journal of Selected Topics in Quantum Electronics, vol. 2, No. 3, pp. 643-649 (Sep. 1996) (7 pages).

T. Kobayashi et al., "Optical Pulse Compression Using High-Frequency Electrooptic Phase Modulation," IEEE Journal of Quantum Electronics, vol. 24, No. 2, pp. 382-387 (Feb. 1988) (6 pages).

Q. Zhang et al., Linearly and Nonlinearly Chirped Bragg Gratings Fabricated on Curved Fibers, Optics Letters, vol. 20, No. 10, pp. 1122-1124 (May 15, 1995) (3 pages).

Japanese Patent Office, International Search Report issued in corresponding International Patent Application No. PCT/JP2013/050432 and translation, (Feb. 12, 2013) (4 pages).

Williams, J.A.R. et al., The Compression of Optical Pulses Using Self-Phase Modulation and Linearly Chirped Bragg-Gratings in Fibers, IEEE Photonics Technology Letters, vol. 7, No. 5 pp. 491-493, (May 1995) (3 pages).

Strickland, Donna et al., "Compression of Amplified Chirped Optical Pulses," Optics Communications, vol. 56, No. 3, pp. 219-211, (Dec. 1, 1985) (3 pages).

Sakamoto, Takahide, et al., 10 GHz, 2.4 ps. Pulse Generation Using a Single-Stage Dual-Drive Mach-Zehnder Modulator, Optics Letters, vol. 33, No. 8, pp. 890-892 (Apr. 15, 2008).

* cited by examiner

OPTICAL PULSE-GENERATOR

TECHNICAL FIELD

The present invention relates to an optical pulse-generator in which an optical frequency comb is used.

BACKGROUND ART

As a technique for generating an optical pulse, an optical pulse-generator obtained by combining an optical frequency comb generator, which produces an optical frequency comb composed of a number of frequency components by modulated light from an light source, and a chirp compensator, which is a compressor to make the light short pulse by compressing the optical frequency comb, has been known.

As the optical frequency comb generator, for example, PTL 1 discloses an optical frequency comb-generator which improves flatness of the optical frequency comb and optimizes the efficiency of the generation of the optical pulse (the power of optical pulse).

In addition, as the chirp compensator compressing the generated optical frequency comb, for example, PTL 2 discloses a wavelength-tunable fiber grating filter in which an arbitrary wavelength and an arbitrary chirp amount can be set.

CITATION LIST

Patent Literature

[PTL 1] Japanese Laid-open Patent Publication No. 2007-248660
[PTL 2] Japanese Laid-open Patent Publication No. H10-221658

SUMMARY OF INVENTION

Technical Problem

A chirp compensator in the related art is for compressing (compensating) an optical frequency comb and generating an optical pulse with an assumption that a chirp of the optical output from an optical frequency comb generator varies linearly with respect to frequencies.

However, for example, in an optical frequency comb generator using a phase modulator such as a phase modulator obtained by inserting a straight waveguide type phase modulator between two mirrors or a Mach-Zehnder waveguide type phase modulator, it has been turned out that the chirp of output optical frequency comb does not vary linearly with respect to frequency, and in actual cases, varies as a sinusoidal waveform.

Therefore, in the chirp compensator of the related art optimized with an assumption of an optical frequency comb having a chirp that varies linearly with respect to frequency instead of a chirp of the optical frequency comb that varies in the above-described manner, the pedestal of the output optical pulse becomes large. More specifically, the components in the bands away from the center frequency of the optical frequency comb in the entire band of the optical frequency comb input to the chirp compensator become the pedestal, and actually, the frequency component contributing on the formation of optical pulse is decreased. As the result, there is a case in which the waveform of the optical pulse after compensation is strained so that it becomes impossible to obtain an optical pulse with clear waveform.

In addition, in a case in which the optical frequency comb is generated by the optical frequency comb generator, a large modulation index (the modulation index is defined by the amplitude of an input RF signal/$V\pi$ of a modulator ($V\pi$ represents the half-wavelength voltage)) is required, and it is necessary to input a modulation signal with a large amplitude to the phase modulator. However, there is an upper limit regarding the amplitude of an electric signal that can be input to the optical frequency comb generator. Due to this, it is necessary to further increase the amplitude of the modulation signal to compress the width of an optical pulse after the chirp compensation; however, in a case in which the chirp compensator of the related art is used, the components that have turned into the pedestal become useless as described the above, and the lower limit of the obtained optical pulse width becomes large in addition to increasing the power consumption. Therefore, in a case to obtain favorable short-pulse light with suppressing the power consumption, it becomes necessary to be lower driving voltage of the optical frequency comb generator itself or to be higher efficiency of the chirp compensator that compresses pulses.

Therefore, it is desired to generate an optical pulse by efficiently using the entire band of the optical frequency comb input to the chirp compensator.

One aspect of the present invention provides an optical pulse-generator capable of generating an optical pulse with no strain by efficiently using the entire band of an optical frequency comb input to a chirp compensator.

Solution to Problem

Several aspects of the present invention provide the following optical pulse-generators.

That is, according to an aspect of the present invention, there is provided an optical pulse-generator including at least an optical frequency comb generator, which includes an optical modulation unit being a phase modulator and a modulation signal-generating unit configured to generate a modulation signal for modulating light and generates an optical frequency comb, and a chirp compensator configured to compress and output the optical frequency comb output from the optical frequency comb-generating unit in accordance with the dispersion characteristics in which the dispersion values of frequencies increase with increasing the distance from the center frequency of the above described optical frequency comb.

The above described optical modulation unit is configured to modulate a phase by a sinusoidal waveform.

The dispersion compensation amount D of the above described chirp compensator with respect to a center frequency $\omega_0$ of the optical frequency comb input to the above described chirp compensator is expressed by Formula (1) when a modulation angular frequency is represented by $\omega_m$, a center wavelength of the optical frequency comb is represented by $\lambda_c$, a modulation index is represented by A, a light speed in a vacuum is represented by c, and a frequency change is represented by $\Delta\omega$.

[Formula 1]

$$D = \frac{2\pi c}{\lambda_c^2} \frac{1}{A\omega_m^2} \frac{1}{\sqrt{1-\left(\frac{\Delta\omega}{A\omega_0}\right)^2}} \qquad \text{FORMULA (1)}$$

A band-pass filter is further provided between the above described optical frequency comb-generating unit and the above described chirp compensator or behind the chirp compensator, and the band-pass filter has a bandwidth which removes the optical frequency comb components in a frequency range in which chirp characteristics in a frequency range away from the center frequency and dispersion characteristics of the chirp compensator do not match each other in the optical frequency combs output from the optical frequency comb-generating unit.

The above described chirp compensator includes an optical circulator and a Chirped Fiber Bragg Grating (CFBG).

A fiber length of the Chirped Fiber Bragg Grating is equal to or longer than $c/4\, f_m n_{eff}$ when a modulation frequency is represented by $f_m$, the light speed in a vacuum is represented by c, and a group refractive index of the fiber is represented by $n_{eff}$.

The cycle $\Delta\Lambda$ along to longitudinal direction of the above described Chirped Fiber Bragg Grating is expressed by Formula (2) when a modulation angular frequency is represented by $\omega_m$, a modulation index is represented by A, a location of the fiber in the longitudinal direction is represented by $\chi$, and a center frequency of the optical frequency comb is represented by $\lambda_c$.

[Formula 2]

$$\Delta\Lambda = \frac{\lambda_c^2 \overline{A} \omega_m}{2\sqrt{2}\,\pi c n_{eff}} \frac{\exp\left(\frac{4n_{eff}\omega_m}{\sqrt{2}\,c}x\right) - 1}{\exp\left(\frac{4n_{eff}\omega_m}{\sqrt{2}\,c}x\right) + 1} \quad \text{FORMULA (2)}$$

A reflection wavelength along to the longitudinal direction of the above described Chirped Fiber Bragg Grating has a value optimized in accordance with Formula (3).

[Formula 3]

$$f(x) = \frac{1}{2}x - \frac{1}{24}x^3 \quad \text{FORMULA (3)}$$

The fiber of the above described Chirped Fiber Bragg Grating has a physical change so as to convert a reflection wavelength having a cubic function shape along to the longitudinal direction.

The above described physical change has a change of extension stress or compression stress against the above described fiber.

The above described fiber has distribution of extension stress and distribution of extension stress is obtained by changing a cross-sectional area of the fiber along to the longitudinal direction, and further applying an extension force or a compression force from outside of the above described fiber.

The above described physical change has a change of a curvature radius along to the longitudinal direction of the above described fiber.

The above described physical change has a change of an effective refractive index along to the longitudinal direction of the above described fiber.

The above described physical change is obtained by providing a temperature gradient along to the longitudinal direction of the above described fiber.

The above described physical change is obtained by an etching treatment on the above described fiber.

Advantageous Effects of Invention

According to the aspects of the present invention, it becomes possible to generate an optical pulse that is closer to the Fourier limit by efficiently using the entire band of an optical frequency comb input to a chirp compensator.

DESCRIPTION OF EMBODIMENTS

Hereinafter, an optical pulse-generator according to an embodiment of the present invention will be described with reference to the drawings. Meanwhile, the embodiment described below is a specific description for better understanding of the purpose of the invention, and does not limit the present invention unless particularly otherwise specified. In addition, in the drawings used for the description, there are cases in which, for convenience, main part are enlarged for better understanding of the embodiment of the present invention, and the dimensional ratios and the like between each components are not always the same as those in the actual cases.

Figure 1A:
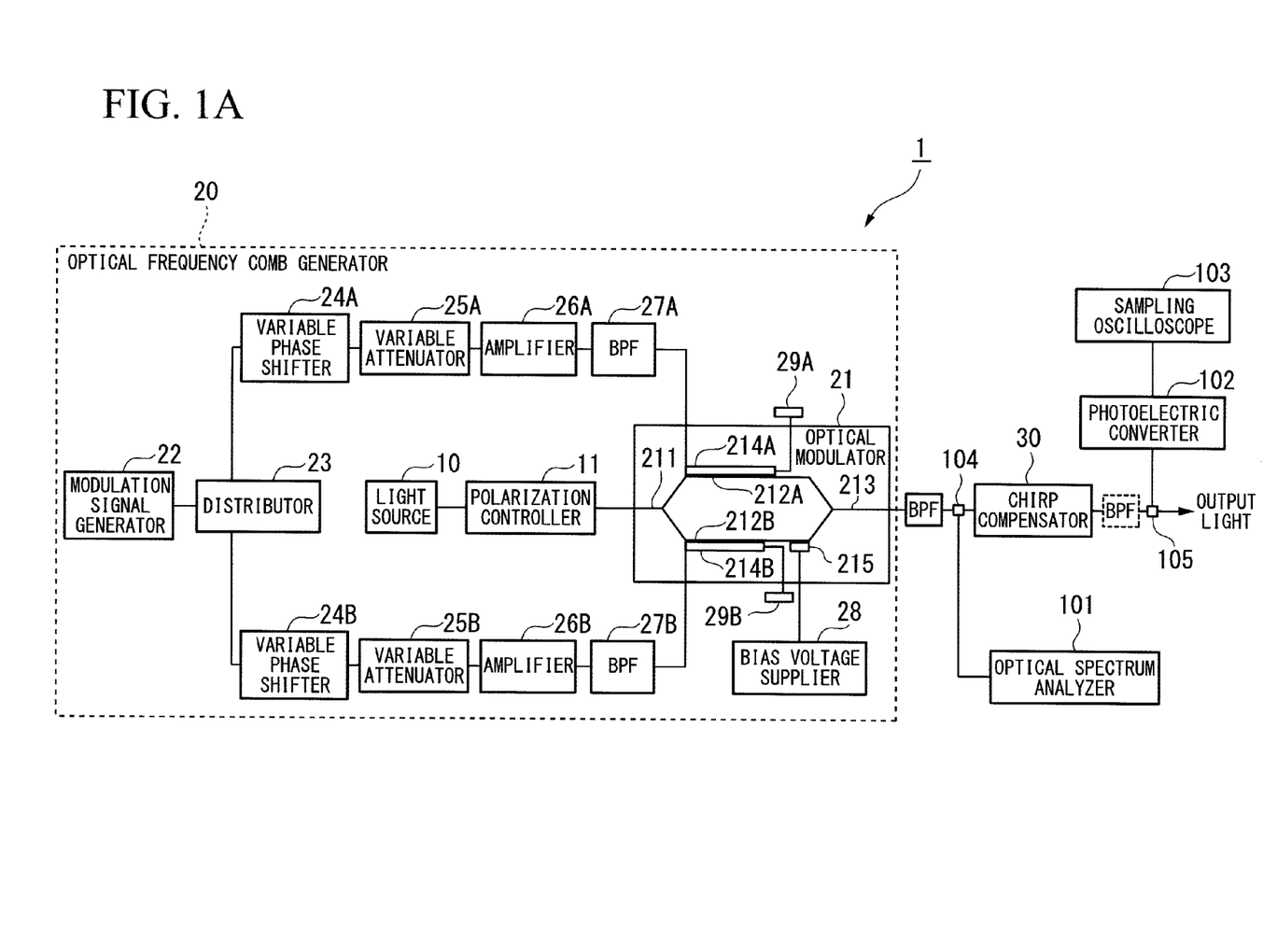
FIG. 1A is a schematic configuration view showing a configuration of an optical pulse-generator according to an embodiment of the present invention.

FIG. 1A is a schematic configuration view showing an embodiment of the optical pulse-generator of the present invention.

An optical pulse-generator 1 includes an optical frequency comb generator 20, a chirp (dispersion) compensator 30, an optical spectrum analyzer 101, a photoelectric converter 102, and a sampling oscilloscope 103.

The optical frequency comb generator 20 includes a Mach-Zehnder type optical modulator (optical modulating unit) 21, a modulation signal generator (modulation signal-generating unit) 22, a distributor 23, variable phase shifters 24A and 24B, variable attenuators 25A and 25B, amplifiers 26A and 26B, band-pass filters 27A and 27B, a bias voltage supply unit 28, a light source 10, and a polarization controller 11.

Figure 1B:
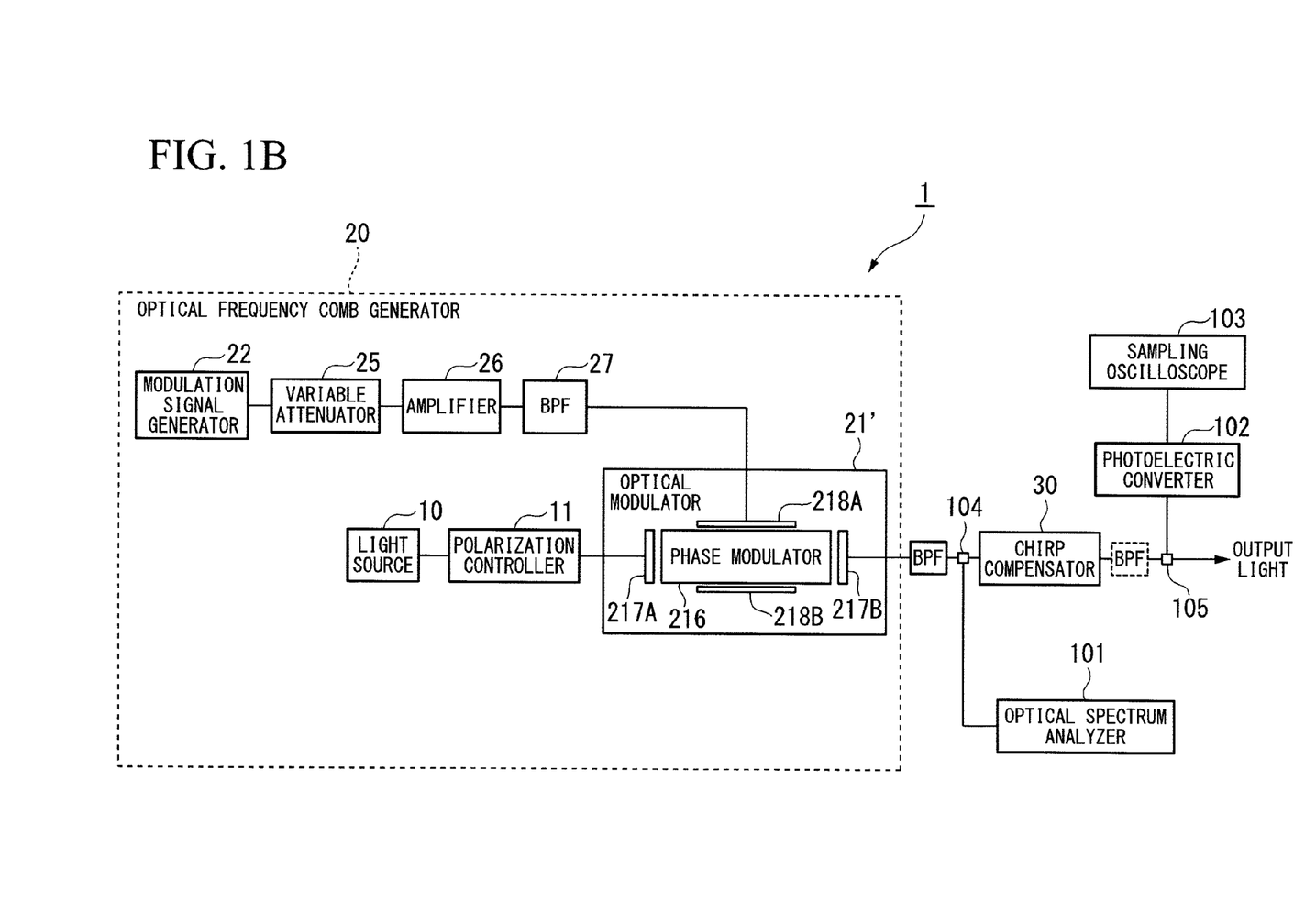
FIG. 1B is a schematic configuration view showing a configuration of another optical pulse-generator according to another embodiment of the present invention.

Meanwhile, in the present embodiment, the Mach-Zehnder type optical modulator which branches light from the light source 10 into two, modulates either or both of the branched light, and then multiplexes the lights is exemplified as the optical modulating unit 21, but the optical modulating unit in the present invention is not limited thereto, and an optical modulating unit having a different configuration, for example, an optical modulating unit 21' (refer to FIG. 1B) including a straight type phase modulator 216 inserted between two mirrors 217A and 217B and electrodes for modulation 218A and 218B is also applicable in the same manner.

The light source 10 is, for example, a laser light source, and generates continuous light with a predetermined wavelength. An output end of the light source 10 is connected with an input end of the polarization controller 11 using an optical fiber. The polarization controller 11 adjusts the polarized state of incident light in a predetermined state. The output end of the polarization controller 11 is connected with an input waveguide 211 of the Mach-Zehnder type optical modulator 21 through an optical fiber.

The Mach-Zehnder type optical modulator 21 includes the input waveguide 211, two branching waveguides 212A and 212B, an output waveguide 213, modulation electrodes 214A and 214B, and a bias electrode 215. Each of the branching waveguides 212A and 212B is connected with the input waveguide 211 and the output waveguide 213. A Mach-Zehnder interferometer is configured by the input waveguide 211, the branching waveguides 212A and 212B, and the output waveguide 213.

The modulation electrode 214A and the modulation electrode 214B are formed on the branching waveguide 212A and the branching waveguide 212B respectively. The bias electrode 215 is formed on either or both of the branching waveguides 212A and 212B. Meanwhile, the modulation electrodes 214A and 214B, and the bias electrode 215 may be formed as a single electrode.

As the Mach-Zehnder type optical modulator 21, for example, an LN modulator having the respective waveguides and the respective electrodes formed on a Z-cut LN substrate can be used. Due to this configuration, the Mach-Zehnder type optical modulator 21 is possible to control independently phase modulation performed for light propagating the two branching waveguides 212A and 212B.

The modulation signal generator 22 generates a modulation signal (for example, a sinusoidal wave) with a predetermined frequency. An output unit of the modulation signal generator 22 is connected with an input unit of the distributor 23. A Wilkinson distributor or a 90° hybrid distributor is applicable as the distributor 23, but the distributor is not limited thereto. One output unit of the distributor 23 is connected with the variable phase shifter 24A, and the other output unit is connected with the variable phase shifter 24B.

Each of the variable phase shifters 24A and 24B makes the phases of the input signal shift by predetermined amounts. The output unit of the variable phase shifter 24A is connected with the variable attenuator 25A, and the output unit of the variable phase shifter 24B is connected with the variable attenuator 25B.

Each of the variable attenuators 25A and 25B makes the power of the input signal attenuate by predetermined amounts. The output unit of the variable attenuator 25A is connected with the amplifier 26A, and the output unit of the variable attenuator 25B is connected with the amplifier 26B.

Each of the amplifiers 26A and 26B amplifies the input signal at predetermined amplification ratio. The output unit of the amplifier 26A is connected with the band-pass filter 27A, and the output unit of the amplifier 26B is connected with the band-pass filter 27B. Meanwhile, a variable amplifier having a variable amplification ratio may be used instead of the combination of the variable attenuators 25A and 25B and the amplifiers 26A and 26B.

In addition, the other ends of the modulation electrodes 214A and 214B in the Mach-Zehnder type optical modulator 21 are respectively connected with termination resistances 29A and 29B provided outside the Mach-Zehnder type optical modulator 21. By the termination resistances 29A and 29B being provided physically apart from and outside the Mach-Zehnder type optical modulator 21, it suppresses the change in the characteristics of the Mach-Zehnder type optical modulator 21 by the influence of heat generation from the termination resistances 29A and 29B.

The bias voltage supply unit 28 supplies a bias voltage to the Mach-Zehnder type optical modulator 21. The output unit of the bias voltage supply unit 28 is connected with the bias electrode 215 in the Mach-Zehnder type optical modulator 21.

Figure 2:
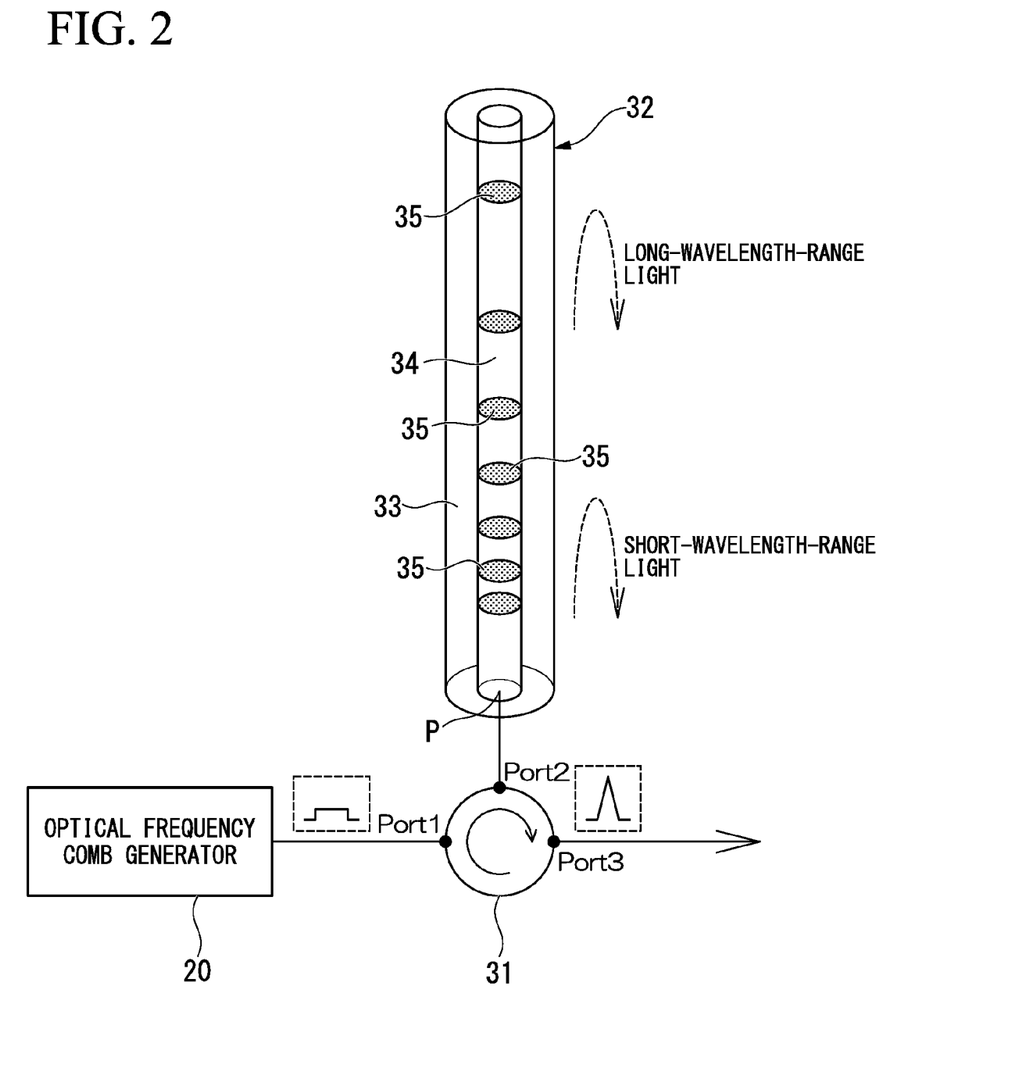
FIG. 2 is a view showing a configuration of a chirp compensator.

As shown in FIG. 2, the chirp (dispersion) compensator 30 includes an optical circulator 31 and a Chirped Fiber Bragg Grating (CFBG) 32. This chirp compensator 30 has dispersion characteristics described later in detail, and outputs an optical frequency comb input from the optical frequency comb generator 20 as a compressed optical pulse. The input unit of the chirp compensator 30 is connected with the output waveguide 213 (refer to FIG. 1A) in the Mach-Zehnder type optical modulator 21.

As the optical circulator 31, for example, a three-terminal optical circulator using the Faraday effect can be used. The above-described optical circulator 31 includes a birefringent crystal material, a prism, a Faraday element, a half wavelength plate, and the like. The optical circulator 31 outputs light input from Port 1 toward Port 2. In addition, the optical circulator outputs 31 light input from Port 2 toward Port 3.

The Chirped Fiber Bragg Grating (CFBG) 32 is formed by, for example, multiple diffraction grating 35, 35, . . . , which reflect light propagating through a core, in a core 34 portion covered with a clad 33 of an optical fiber. The diffraction grating 35, 35, . . . are provided along to the longitudinal direction of CFBG 32 with mutually different intervals so that the periods of the gratings are set to be different.

For example, in a region close to an input and output end P of CFBG 32, light with short wavelength range in the input light (optical frequency combs) is reflected, and in a region far from the input and output end P, light with long wavelength range is reflected. Then, light (optical frequency combs) input to the input and output end P of CFBG 32 is compressed so that it turned into short-pulse light and is output from the input and output end P again. The above-described dispersion characteristics of CFBG 32 will be described later in detail.

The optical spectrum analyzer 101 is equipment for analyzing the spectrum of the input light and the input unit thereof is connected with a branching unit 104 (an optical coupler or the like) provided in latter part (output side) of the Mach-Zehnder type optical modulator 21.

The photoelectric converter 102 is connected with a branching unit 105 (an optical coupler or the like) provided in latter part (output side) of the chirp compensator 30, and converts light branched from the branching unit 105 to electric signal.

The sampling oscilloscope 103 is equipment for observing the time domain signal of the input signal and an input unit thereof is connected with the photoelectric converter 102.

Next, the function of the optical pulse-generator 1 configured as described above will be described.

When an optical pulse is generated using the optical pulse-generator 1, first, continuous light having a predetermined wavelength is generated from the light source 10. The light output from the light source 10 enters into the Mach-Zehnder type optical modulator 21 through the polarization controller 11. In the Mach-Zehnder type optical modulator 21, the light is branched into the branching waveguides 212A and 212B from the input waveguide 211 and propagates through the respective branching waveguides. At this time, the phases of the propagating light change in accordance with the electric fields by the modulation electrodes 214A and 214B, and the bias electrode 215 while the light is propagating through the branching waveguides 212A and 212B. And then, the light with the modulated phases are multiplexed again in the output waveguide 213.

Here, when the amplitude and frequency of the light input to the Mach-Zehnder type optical modulator 21 are represented by $E_0$ and $\omega_0$ respectively, and the phase changes of the propagating light changed in the branching waveguides 212A and 212B are represented by $\theta_1$ and $\theta_2$, the light after multiplexed in the output waveguide 213, that is, the change over time E(t) of the amplitude of the output light from the optical frequency comb generator 20 (the output light from the Mach-Zehnder type optical modulator 21) is expressed by the following formula (7).

$$E(t)=E_0[\sin(\omega_0 t+\theta_1)+\sin(\omega_0 t+\theta_2)]/2 \qquad (7)$$

Here, $$\theta_1=A_1\sin(\omega_m t)+B_1 \qquad (8)$$

$$\theta_2=A_2\sin(\omega_m t)+B_2 \qquad (9)$$

$$\omega_m=2\pi f_m \qquad (10)$$

$A_1$: the amplitude of modulation applied to the propagated light in the branching waveguide 212A by the modulation electrode 214A

$A_2$: the amplitude of modulation applied to the propagated light in the branching waveguide 212B by the modulation electrode 214B

$B_1$: the bias phase applied to the propagated light in the branching waveguide 212A by the bias electrode 215

$B_2$: the bias phase applied to the propagated light in the branching waveguide 212B by the bias electrode 215

$f_m$: the modulation frequency of a modulated signal generated by the modulation signal generator 22. In addition, in the formulae (8) and (9), it is considered that there is no phase shifting (skew) between the modulation signal input to the modulation electrode 214A through the path of the variable phase shifter 24A to the band-pass filter 27A and the modulation signal input to the modulation electrode 214B through the path of the variable phase shifter 24B to the band-pass filter 27B.

Based on the above-described formula (7), the power P(t) and frequency $\omega(t)$ of the light output from the optical frequency comb generator 20 can be expressed by the following formulae (11) and (12) respectively.

$$P(t)=P_0[1+\cos\{\Delta A\sin(\omega_m t)+\Delta\theta\}]/2 \qquad (11)$$

$$\omega(t)=\omega_0-\omega_m A\cos(\omega_m t) \qquad (12)$$

Here, $$\Delta A=A_1-A_2 \qquad (13)$$

$$\Delta\theta=B_1-B_2 \qquad (14)$$

$$A=(A_1+A_2)/2 \qquad (15).$$

In addition, $P_0$ represents the power of the light input to the Mach-Zehnder type optical modulator 21.

It has been thought that the chirp of the optical frequency comb output from the optical frequency comb generator changes linearly (straight like). However, it has been found that, in actual cases, the chirp of the optical frequency comb output from the optical frequency comb generator 20 does not change linearly. That is, the Mach-Zehnder type optical modulator (optical modulating unit) 21 does a phase modulation with a sinusoidal waveform.

Figure 3:
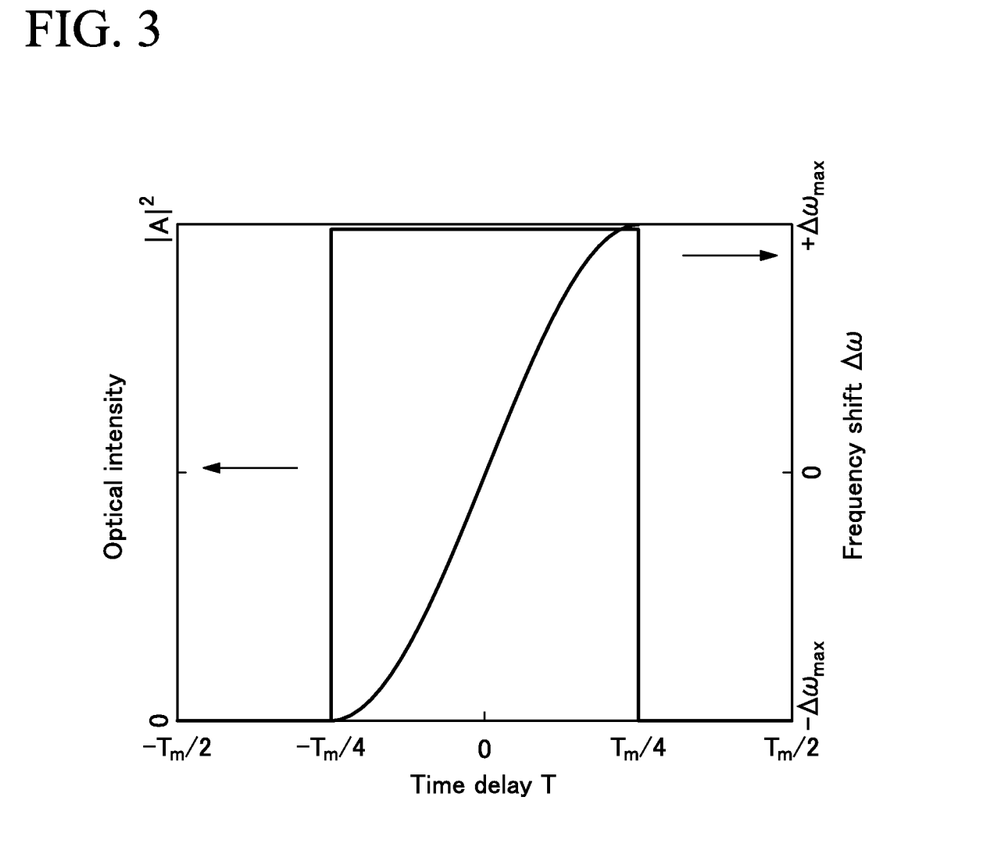
FIG. 3 is a graph showing a chirp model of an actual optical frequency comb output from a frequency comb generator.

FIG. 3 is a graph showing a chirp model of an actual optical frequency comb output from the optical frequency comb generator. According to FIG. 3, the frequency shift $\Delta\omega$ of the chirp of the optical frequency comb output from the optical frequency comb generator sinusoidally changes with respect to the time (T). $\Delta\omega_{max}$ in FIG. 3 represents the maximum frequency shift amount from the center frequency $\omega_0$ in case of doing phase modulation with a modulation signal frequency $f_m$, and $T_m$ represents the modulation signal period.

The chirp (dispersion) compensator 30 is capable of outputting a narrower width of optical pulse than that in the related art by chirp compensation using a dispersion medium having high-order dispersion characteristics in which dispersion becomes larger as the frequencies are farther away from the center frequency corresponding to the optical frequency comb having the characteristics as shown in FIG. 3.

For example, the above-mentioned high-order dispersion characteristics can be realized by using the Chirped Fiber Bragg Grating (CFBG) 32.

Next, the dispersion characteristics of the chirp (dispersion) compensator 30 for forming an optical pulse by efficiently compressing the entire band of the optical frequency comb having the characteristics as shown in FIG. 3 will be described.

The frequency shift ($\Delta\omega$) of the optical frequency comb having the characteristics as shown in FIG. 3 is expressed by the second element of the above-described formula (12). That is, the frequency shift is expressed by the following formula (16).

$$\Delta\omega=\omega_m A\cos(\omega_m t) \qquad (16)$$

From the formula (16), the following formula (17) is derived.

$$t=1/\omega_m \arcsin(\Delta\omega/A\omega_m) \qquad (17)$$

Obtaining the value of the group velocity dispersion (GVD: $\beta_2$) applied by the above-described formula (17), the following formula is described (18).

$$-\beta_2(\Delta\omega)L=dt/d\Delta\omega \qquad (18)$$

Here,

L=the length of CFBG along to the longitudinal direction (medium length)

Meanwhile, the length L of CFBG along to the longitudinal direction has a length that becomes equal to or longer than $c/4 f_m n_{eff}$ when the modulation frequency is represented by $f_m$, the light speed in a vacuum is represented by c, and the group refractive index of the fiber is represented by $n_{eff}$.

Based on the above-described formula (18), the dispersion characteristics (D) required by the chirp (dispersion) compensator 30 are expressed by the following formula (1).

Here, a modulation angular frequency is represented by $\omega_m$, the wavelength of the optical frequency comb is represented by $\lambda_c$, the modulation index is represented by A, the light speed in a vacuum is represented by c, and the frequency change is represented by $\Delta\omega$.

[Formula 4]

$$D=\frac{2\pi c}{\lambda_c^2}\frac{1}{A\omega_m^2}\frac{1}{\sqrt{1-\left(\frac{\Delta\omega}{A\omega_m}\right)^2}} \qquad \text{FORMULA (1)}$$

Figure 4:
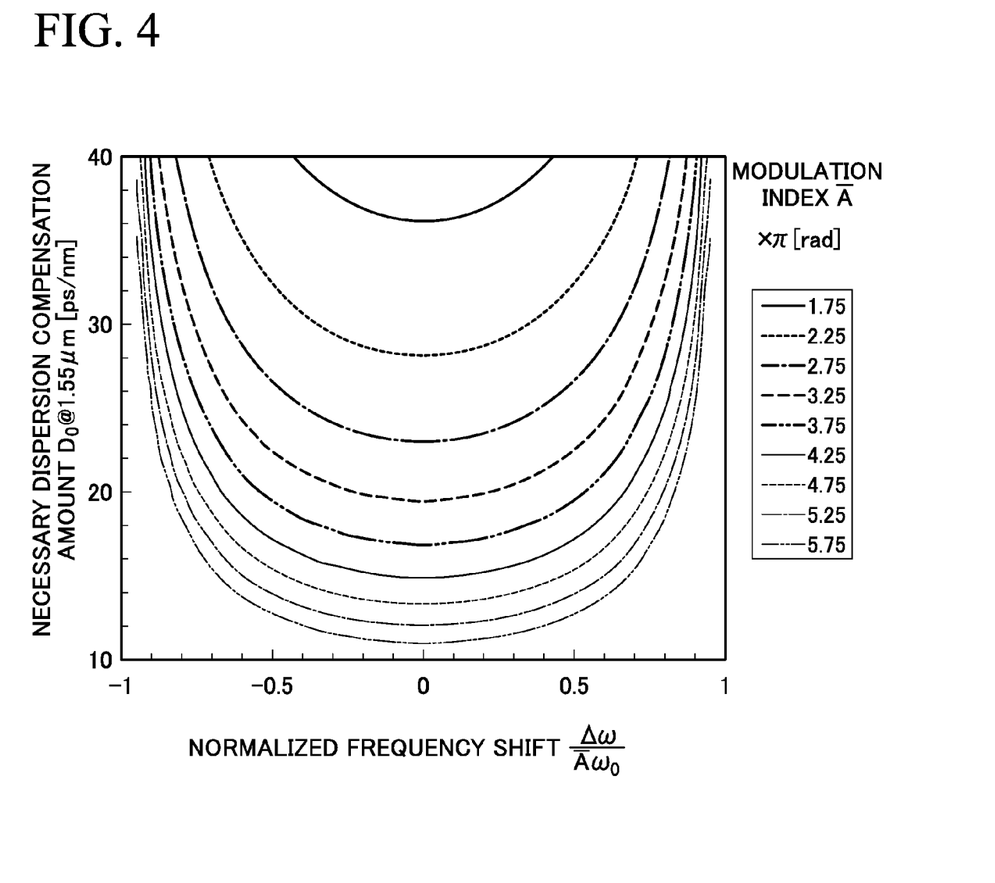
FIG. 4 is a graph showing the calculation results of dispersion compensation amounts (dispersion characteristics) necessary for the chirp (dispersion) compensator.

The calculation results of dispersion compensation amounts (dispersion characteristics) necessary for the chirp (dispersion) compensator 30 obtained by the modulation index A as a parameter and applying, for example, a wavelength of 1.55 µm to the variable $\Delta\omega/\Delta\omega_0$ in the above-described formula (1) are shown in the graph of FIG. 4.

According to the graph shown in FIG. 4, it is found that, the dispersion compensation amounts (dispersion characteristics) necessary for the chirp (dispersion) compensator 30 to efficiently compress the optical frequency comb sinusoidally changing as shown in FIG. 3 is that the dispersion compensation amount required at the center frequency becomes $2/\pi$ of a chirp in case of a linear chirp approximation and that the required dispersion compensation amount becomes bigger as the frequency shift becomes larger.

Therefore, while dispersion characteristics of the chirp compensator used in the related art forms a straight line in parallel with the x axis in the drawing, it is found from the graph shown in FIG. 4 that it is insufficient. It is found that, instead, the chirp compensator which has V-shaped or U-shaped dispersion characteristics that are bilaterally symmetric at the value of the center frequency is preferred and that it is ideal that a curved line is bilaterally symmetric at the value of the center frequency.

Figure 5:
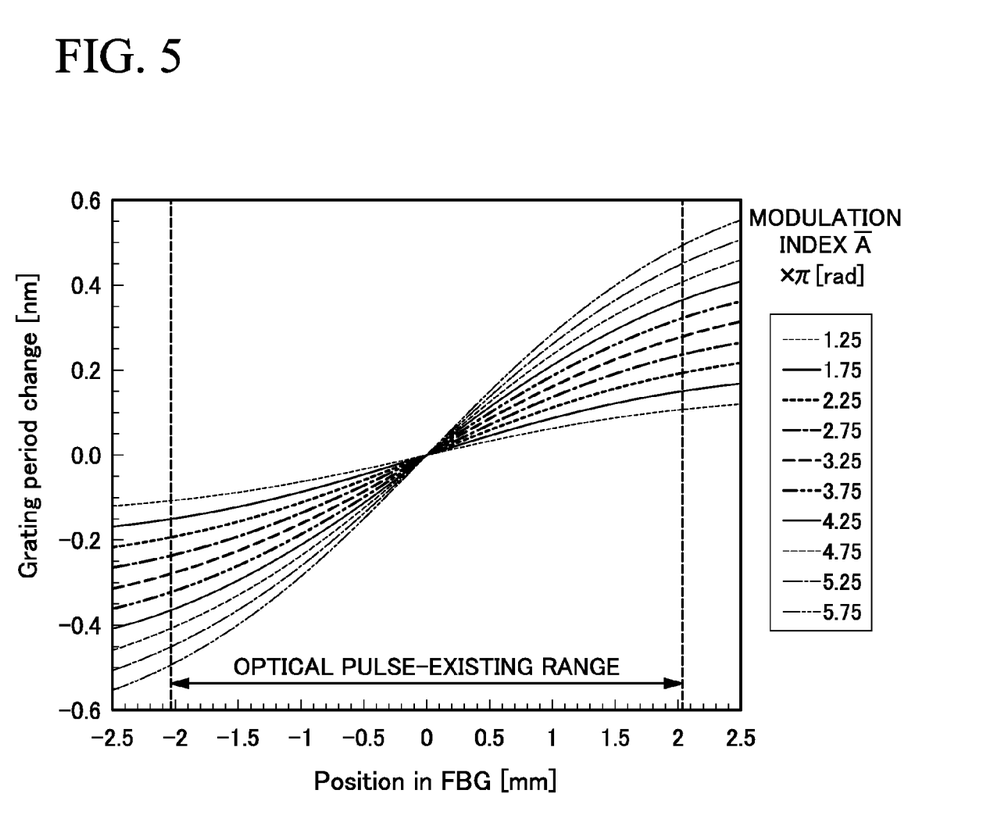
FIG. 5 is a graph showing the characteristics of a Chirped Fiber Bragg Grating (CFBG).

Next, when the characteristics of the Chirped Fiber Bragg Grating (CFBG) 32 are illustrated on the basis of the graph shown in FIG. 4, the graph shown in FIG. 5 is formed. Based on the characteristics of the Chirped Fiber Bragg Grating (CFBG) 32 as shown in FIG. 5, the period $\Delta\Lambda$ of CFBG is expressed by the following formula (2).

Here, a modulation angular frequency is represented by $\omega_m$, the modulation index is represented by A, the location of the fiber along to the longitudinal direction is represented by $\chi$, and the center wavelength of the optical frequency comb is represented by $\lambda_c$.

[Formula 5]

$$\Delta\Lambda = \frac{\lambda_c^2 \overline{A}\omega_m}{2\sqrt{2}\,\pi c n_{e\!f\!f}} \frac{\exp\!\left(\frac{4 n_{e\!f\!f}\,\omega_m}{\sqrt{2}\,c} x\right) - 1}{\exp\!\left(\frac{4 n_{e\!f\!f}\,\omega_m}{\sqrt{2}\,c} x\right) + 1} \quad \text{FORMULA (2)}$$

In addition, the reflection wavelength of the Chirped Fiber Bragg Grating (CFBG) 32 is optimized in accordance with the formula (3).

$$f(x) = \frac{1}{2}x - \frac{1}{24}x^3 \quad \text{FORMULA (3)}$$

As mentioned the above, the optical frequency comb output from the optical frequency comb generator 20 using the Mach-Zehnder type optical modulator 21 forms a time domain signal sinusoidally changing as shown in FIG. 3. When the chirp (dispersion) compensator 30 is provided with the dispersion compensation amounts (dispersion characteristics) as described in Formula (1) for the above-described optical frequency comb, it is possible to efficiently (with a small loss) compress the entire band of the input optical frequency comb sinusoidally changing. Then, the loss of the frequency components contributing to the formation of an optical pulse is suppressed, the peak power of the optical pulse after chirp compensation is increased, the pulse width can be shortened, and consequently, it becomes possible to obtain an optical pulse with a clear waveform having no strain.

Meanwhile, in the above-described embodiment, the periods of gratings are set to be different by providing mutually different intervals of the diffraction grating along to the longitudinal direction of the optical fiber in the core portion of the optical fiber as the Chirped Fiber Bragg Grating (CFBG). In addition, in the above-described embodiment, it is also possible to shift the center frequency by means of, for example, applying an extension force and a compression force to the longitudinal direction of the optical fiber by physical means and providing a temperature gradient by heating and cooling means.

In addition, in the above-described embodiment, the optical frequency comb generator including the Mach-Zehnder type optical modulator as the phase modulator is used, but it is also possible to use other type phase modulators, for example, the structure having a straight type phase modulator inserted between two mirrors.

FIGS. 6A to 6D are views showing the variations of the Chirped Fiber Bragg Grating (CFBG). In a Chirped Fiber Bragg Grating (CFBG) 51 shown in FIG. 6A, the grating intervals in a fiber 52 are linearly changed, and furthermore, the circumferential surface of the fiber 52 is coated with a resin 53. The radius of the resin 53 covering the fiber 52 along to the cross-sectional direction has the shape increased or decreased like in a second-order function manner with a point-symmetric at the center of the grating interval corresponding to the center wavelength of the input optical frequency comb. The above-described CFBG 51 is obtained by adding an extension force along to the longitudinal direction of the fiber 52. Then, it is possible to convert the reflection wavelength like a parabolic shape. Generally, as the diameter of an optical fiber is small so that it is hard to do increasing or decreasing process of an optical fiber to the direction of the diameter, it is more realistic to form a configuration in which the resin 53 covering the fiber 52 is formed and the radius of the resin to the cross-sectional direction is increased or decreased.

Figure 6A:
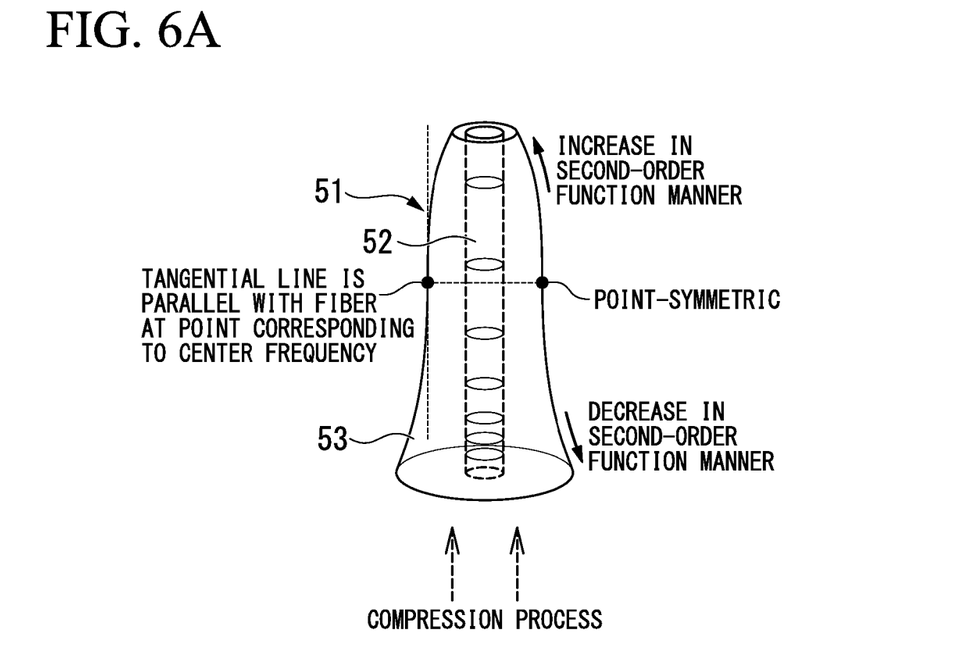
FIG. 6A is a view showing a variation of the Chirped Fiber Bragg Grating (CFBG).
Figure 6B:
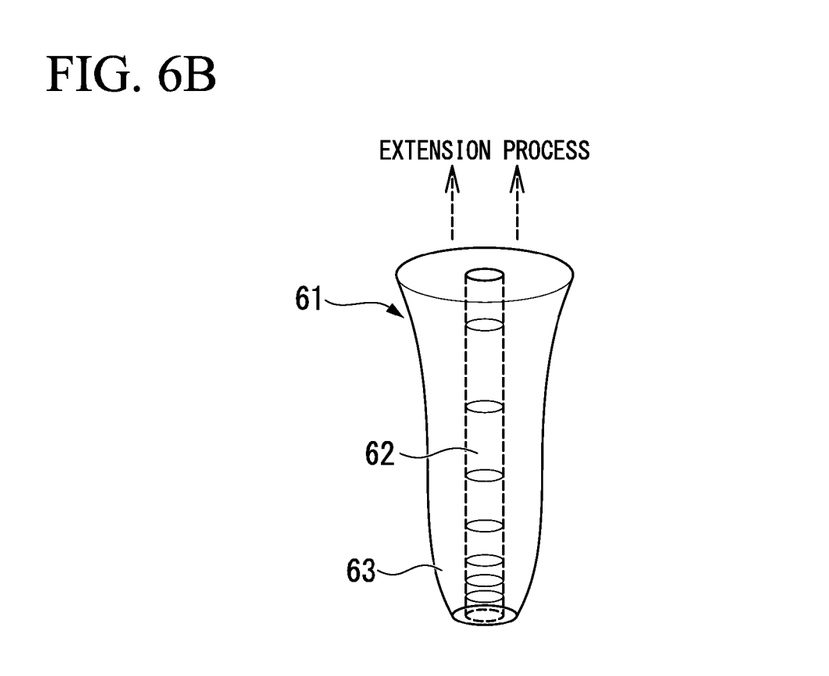
FIG. 6B is a view showing a variation of the Chirped Fiber Bragg Grating (CFBG).

In addition, in a Chirped Fiber Bragg Grating (CFBG) 61 shown in FIG. 6B, the radius to the cross-sectional direction of the resin 63 covering the fiber 62 forms a shape that increases to the opposite direction from the resin 53 of CFBG 51 shown in FIG. 6A. In this way, CFBG 51 shown in FIG. 6A and CFBG 61 shown in FIG. 6B form vice versa relationship between a case in which a compression force is applied to the fiber and a case in which an extension force is applied.

Figure 6C:
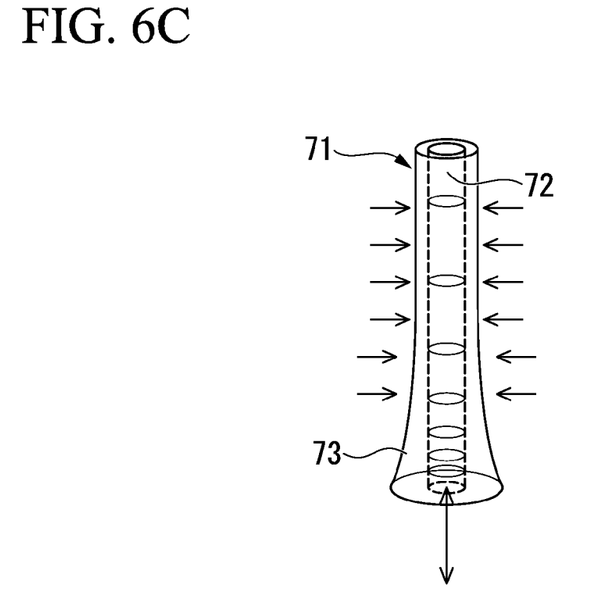
FIG. 6C is a view showing a variation of the Chirped Fiber Bragg Grating (CFBG).

The Chirped Fiber Bragg Grating (CFBG) 71 shown in FIG. 6C has the shape in which the grating intervals in a fiber 72 are linearly changed, and furthermore, the radius to the cross-sectional direction of a resin 73 covering the circumferential surface of the fiber 72 forms gradually increase toward the input and output end portions.

Figure 6D:
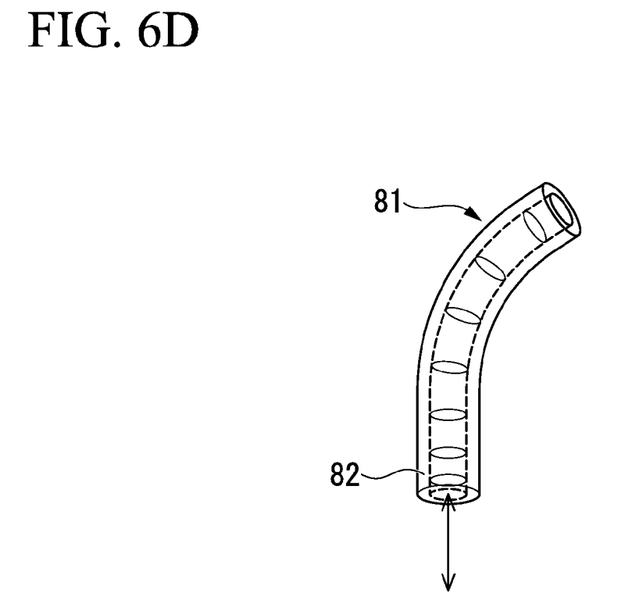
FIG. 6D is a view showing a variation of the Chirped Fiber Bragg Grating (CFBG).

Furthermore, the Chirped Fiber Bragg Grating (CFBG) 81 shown in FIG. 6D has the curved shape in which the curvature radius changes alone to the longitudinal direction of the fiber 82. By this, it is possible to convert the wavelength of the reflection light like a parabolic shape. In this case, the relationship between the increase and decrease of the curvature radius is similar to the relationship between the increase and decrease of the radius of CFBG along to the cross-sectional direction in FIGS. 6A and 6B.

Additionally, the Chirped Fiber Bragg Grating (CFBG) in the present invention can be configured by, for example, adding a physical change, such as, changing the effective refractive index along to the longitudinal direction of the optical fiber, forming a temperature gradient along to the longitudinal direction of the optical fiber, or changing the cross-sectional area by etching the optical fiber.

REFERENCE SIGNS LIST

1 OPTICAL PULSE-GENERATOR
20 OPTICAL FREQUENCY COMB GENERATOR
21 MACH-ZEHNDER TYPE OPTICAL MODULATOR (OPTICAL MODULATING UNIT)
22 MODULATION SIGNAL GENERATOR (MODULATION SIGNAL-GENERATING UNIT)
27A, 27B BAND-PASS FILTER
30 CHIRP (DISPERSION) COMPENSATOR
31 OPTICAL CIRCULATOR
32 CHIRPED FIBER BRAGG GRATING (CFBG)

The invention claimed is:

1. An optical pulse-generator comprising:
an optical frequency comb generator comprising:
   an optical modulation unit being a phase modulator; and
   a modulation signal-generating unit configured to generate a modulation signal for modulating light,
   the optical frequency comb generator being configured to generate an optical frequency comb; and
a chirp compensator configured to compress and output the optical frequency comb output from the optical frequency comb generator in accordance with the dispersion characteristics in which the dispersion values of frequencies increase with increasing the distance from the center frequency of the optical frequency comb,
wherein a dispersion compensation amount D of the chirp compensator with respect to a center frequency $\omega_0$ of the optical frequency comb input to the chirp compensator is expressed by Formula (1) when a modulation angular frequency is represented by $\omega_m$, a center wavelength of the optical frequency comb is represented by $\lambda_c$, a modulation index is represented by A, a light speed in a vacuum is represented by c, and a frequency change is represented by $\Delta\omega$

[Formula 1]

$$D = \frac{2\pi c}{\lambda_c^2} \frac{1}{A\omega_m^2} \frac{1}{\sqrt{1-\left(\frac{\Delta\omega}{A\omega_m}\right)^2}}. \qquad \text{FORMULA (1)}$$

2. The optical pulse-generator according to claim 1, wherein the optical modulation unit is configured to modulate a phase with a sinusoidal waveform.

3. The optical pulse-generator according to claim 2, further comprising a band-pass filter provided between the optical frequency comb generator and the chirp compensator or behind the chirp compensator, and
the band-pass filter having a bandwidth which removes the optical frequency comb components in a frequency range in which chirp characteristics in a frequency range away from the center frequency and dispersion characteristics of the chirp compensator do not match each other in the optical frequency combs output from the optical frequency comb generator.

4. The optical pulse-generator according to claim 3, wherein the chirp compensator comprises an optical circulator and a Chirped Fiber Bragg Grating (CFBG), and
a fiber length of the Chirped Fiber Bragg Grating is equal to or longer than $c/4f_m n_{eff}$ when a modulation frequency is represented by $f_m$, the light speed in a vacuum is represented by c, and a group refractive index of the fiber is represented by $n_{eff}$.

5. The optical pulse-generator according to claim 4, wherein a period $\Delta\Lambda$ along to a longitudinal direction of the Chirped Fiber Bragg Grating is expressed by Formula (2) when a modulation angular frequency is represented by $\omega_m$, a modulation index is represented by A, a location of the fiber in the longitudinal direction is represented by $\chi$, and a center wavelength of the optical frequency comb is represented by $\lambda_c$

[Formula 2]

$$\Delta\Lambda = \frac{\lambda_c^2 \overline{A}\omega_m}{2\sqrt{2}\,\pi c n_{eff}} \frac{\exp\left(\frac{4n_{eff}\omega_m}{\sqrt{2}\,c}x\right)-1}{\exp\left(\frac{4n_{eff}\omega_m}{\sqrt{2}\,c}x\right)+1}. \qquad \text{FORMULA (2)}$$

6. The optical pulse-generator according to claim 5, wherein a reflection wavelength along to the longitudinal direction of the Chirped Fiber Bragg Grating has a value optimized in accordance with Formula (3)

[Formula 3]

$$f(x) = \frac{1}{2}x - \frac{1}{24}x^3. \qquad \text{FORMULA (3)}$$

7. An optical pulse-generator, comprising:
an optical frequency comb generator comprising:
   an optical modulation unit being a phase modulator; and
   a modulation signal-generating unit configured to generate a modulation signal for modulating light,
   the optical frequency comb generator being configured to generate an optical frequency comb;
a chirp compensator configured to compress and output the optical frequency comb output from the optical frequency comb generator in accordance with the dispersion characteristics in which the dispersion values of frequencies increase with increasing the distance from the center frequency of the optical frequency comb; and
a band-pass filter provided between the optical frequency comb generator and the chirp compensator or behind the chirp compensator,
wherein the band-pass filter has a bandwidth which removes the optical frequency comb components in a frequency range in which chirp characteristics in a frequency range away from the center frequency and dispersion characteristics of the chirp compensator do not match each other in the optical frequency combs output from the optical frequency comb generator.

8. An optical pulse-generator comprising:
an optical frequency comb generator comprising:
   an optical modulation unit being a phase modulator; and
   a modulation signal-generating unit configured to generate a modulation signal for modulating light,
   the optical frequency comb generator being configured to generate an optical frequency comb; and
a chirp compensator configured to compress and output the optical frequency comb output from the optical frequency comb generator in accordance with the dispersion characteristics in which the dispersion values of frequencies increase with increasing the distance from the center frequency of the optical frequency comb,
wherein the chirp compensator comprises an optical circulator and a Chirped Fiber Bragg Grating (CFBG).

9. The optical pulse-generator according to claim 8,
wherein a fiber length of the Chirped Fiber Bragg Grating is equal to or longer than $c/4f_m n_{eff}$ when a modulation frequency is represented by $f_m$, the light speed in a vacuum is represented by c, and a group refractive index of the fiber is represented by $n_{eff}$.

10. The optical pulse-generator according to claim 8,
wherein a period $\Delta\Lambda$ along to a longitudinal direction of the Chirped Fiber Bragg Grating is expressed by Formula (2) when a modulation angular frequency is represented by $\omega_m$, a modulation index is represented by A, a location of the fiber in the longitudinal direction is represented by $\chi$, and a center wavelength of the optical frequency comb is represented by $\lambda_c$

[Formula 2]

$$\Delta\Lambda = \frac{\lambda_c^2 \overline{A} \omega_m}{2\sqrt{2}\pi c n_{eff}} \frac{\exp\left(\frac{4n_{eff}\omega_m}{\sqrt{2}c}x\right) - 1}{\exp\left(\frac{4n_{eff}\omega_m}{\sqrt{2}c}x\right) + 1}.$$ FORMULA (2)

11. The optical pulse-generator according to claim 8,
wherein a reflection wavelength along to the longitudinal direction of the Chirped Fiber Bragg Grating has a value optimized in accordance with Formula (3)

[Formula 3]

$$f(x) = \frac{1}{2}x - \frac{1}{24}x^3.$$ FORMULA (3)

12. The optical pulse-generator according to claim 11,
wherein the fiber of the Chirped Fiber Bragg Grating has a physical change so as to convert a reflection wavelength having a cubic function shape with respect to the longitudinal direction.

13. The optical pulse-generator according to claim 12,
wherein the physical change includes a change in extension stress or compression stress with respect to the fiber.

14. The optical pulse-generator according to claim 13,
wherein the fiber has an extension stress distribution, and the extension stress distribution is obtained by changing a cross-sectional area of the fiber along to the longitudinal direction, and further applying an extension force or a compression force from outside of the fiber.

15. The optical pulse-generator according to claim 12,
wherein the physical change includes a change in a curvature radius along to the longitudinal direction of the fiber.

16. The optical pulse-generator according to claim 12,
wherein the physical change includes a change in an effective refractive index along to the longitudinal direction of the fiber.

17. The optical pulse-generator according to claim 12,
wherein the physical change is obtained by providing a temperature gradient along to the longitudinal direction of the fiber.

18. The optical pulse-generator according to claim 12,
wherein the physical change is obtained by performing an etching treatment on the fiber.

* * * * *